G. D. BAILEY.
BEARING.
APPLICATION FILED FEB. 20, 1917.

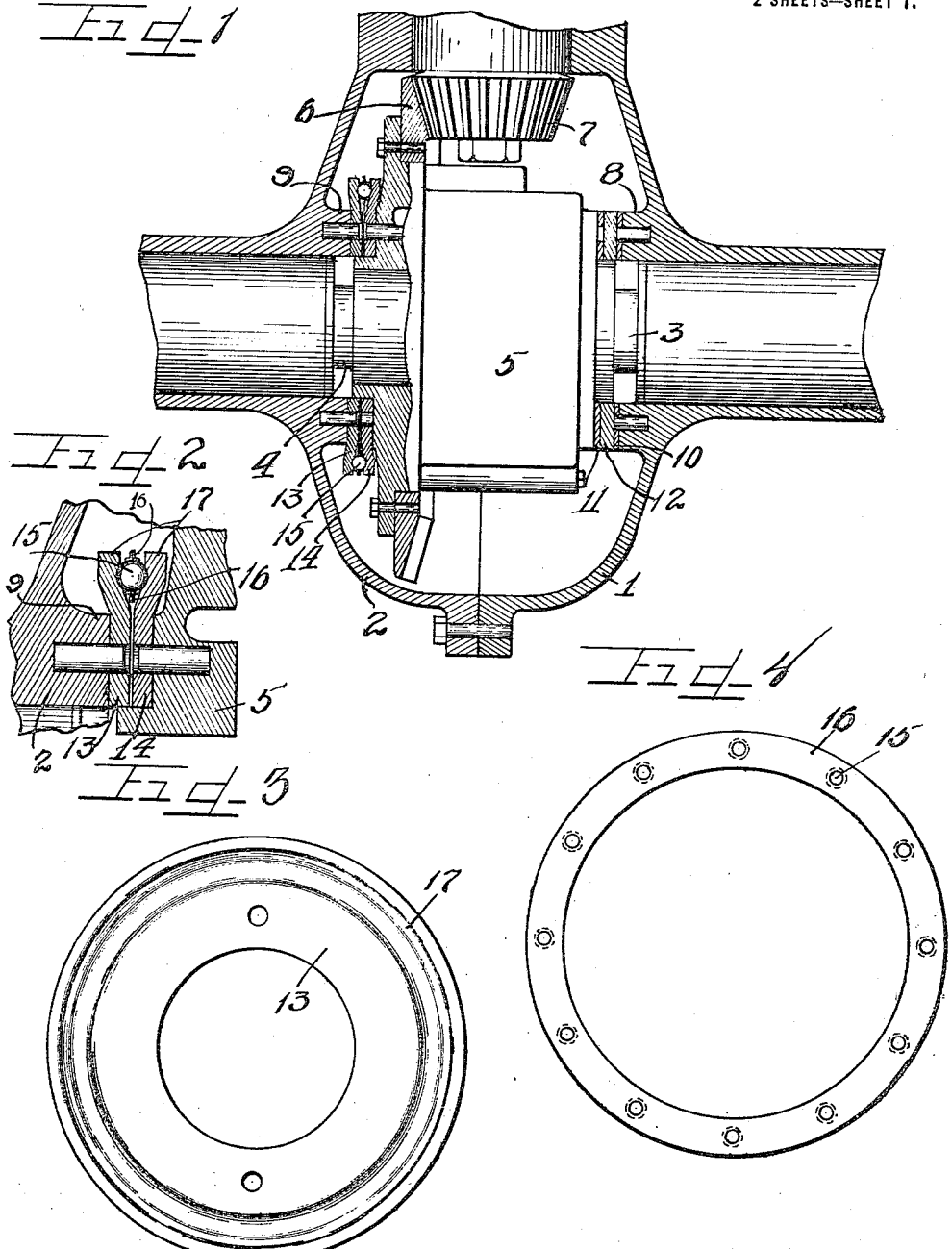

1,265,871.

Patented May 14, 1918.
2 SHEETS—SHEET 2.

Witnesses
J. W. Angell
Charles W. Hills

Inventor
George D. Bailey
by Charles W. Hills
Atty

UNITED STATES PATENT OFFICE.

GEORGE D. BAILEY, OF CHICAGO, ILLINOIS, ASSIGNOR TO GEO. D. BAILEY CO., A CORPORATION OF ILLINOIS.

BEARING.

1,265,871.  Specification of Letters Patent.  Patented May 14, 1918.

Application filed February 20, 1917. Serial No. 149,933.

*To all whom it may concern:*

Be it known that I, GEORGE D. BAILEY, a citizen of the United States, and a resident of the city of Chicago, in the county of Cook and State of Illinois, have invented certain new and useful Improvements in Bearings; and I do hereby declare that the following is a full, clear, and exact description of the same, reference being had to the accompanying drawings, and to the numerals of reference marked thereon, which form a part of this specification.

This invention relates to an improved type of ball or roller bearing in which an entirely new idea in design is used, permitting ball or roller bearings having the ball or roller elements of any desired size and number according to the load to be carried, and yet with the bearing races so constructed as to permit insertion thereof into a small or restricted space, which, in some instances, may even be smaller than the ball or roller elements themselves. A bearing of this type has a wide field of application, for the reason that heretofore, particularly in thrust bearings, the amount of space provided between the parts wherein the bearing is placed has determined the size and design of the bearing, and as a consequence, where only a small space has been available, oftentimes it has not been possible to use a ball or roller type of bearing of sufficient size to withstand the load.

This invention relates to a bearing wherein the race members, at or near their periphery, are bent, bulged, stamped or otherwise formed outwardly away from one another, affording a race for the ball or roller elements, and the inner portions of said race members are disposed in the space between the mechanisms to be separated by the bearing, and may be spaced apart only a few thousandths of an inch for clearance. This type of bearing when constructed as a thrust bearing is particularly adapted for replacement of the ordinary plain thrust bearing provided in the differential of many small motor cars. The race members may be secured into the small bearing space provided, and the peripheral portions of the race members bulge outwardly into the space exterior of the mechanisms separated, that is, the diameter of the race members at the point at which the balls or rollers are mounted is greater than the diameter of the mechanisms separated by the bearing.

It is an object therefore of this invention to construct a bearing comprising race members, the outer periphery of each of which is disposed beyond the periphery of the mechanisms separated by the bearing, and are bulged outwardly to permit use of ball or roller elements of any desired size, shape and number to properly carry the load imposed upon the bearing by said mechanisms.

It is also an object of this invention to construct a bearing wherein the race members are attached between the mechanisms to be separated by the bearing and with the outer periphery of the race members formed to afford a different width race for the rollers, than the greatest width between the adjacent faces of said mechanisms.

It is also an object of this invention to construct a bearing wherein the race members of the bearing are deformed to permit adaptation of the bearing to a restricted space, and permitting use of ball or roller elements of any desired size, shape and number according to the deformation of the race members.

It is further an object of this invention to construct a bearing embracing the use of rolling members with the race elements of the bearing deformed so as to permit disposition of the rolling members beyond the boundary of the mechanisms between which the bearing is mounted.

Other and further important objects will be apparent from the disclosure in the drawings, specification and claims.

The invention (in a preferred form) is illustrated in the drawings and hereinafter more fully described.

On the drawings:

Figure 1 is a central section taken through a conventional type of small car differential, illustrating the replacement of the plain thrust bearing thereof by a ball bearing embodying the principles of my invention, Fig. 2 is an enlarged sectional detail showing a portion of the bearing between the mechanisms of Fig. 1.

Fig. 3 is an interior face view of one of the bearing race rings.

Fig. 4 is a face view of the ball retainer of a bearing.

As shown on the drawings:

Figure 6:
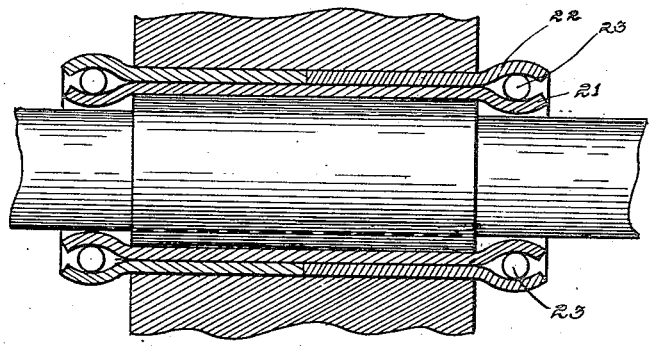
Fig. 6 is a view illustrating the use of a bearing embodying my invention in connection with an axle.

The reference numerals 1 and 2, indicate the split sections of a differential casing or housing, and extending thereinto are shaft sections 3 and 4, respectively, which extend into a differential cage 5, to which a bevel ring gear 6, is bolted in a usual manner. The ring gear 6, meshes with a small driving bevel pinion 7, which is disposed within the differential housing and is secured upon the end of a drive shaft. As clearly shown in Figs. 1 and 2, inwardly directed hub extensions 8 and 9, respectively, are formed integrally upon the inner surfaces of the walls of the differential housing. The cage element 5, is journaled upon the inner ends of the respective shaft sections 3 and 4, and is held from longitudinal movement within the differential housing by end bearings. One of said end bearings consists of a plain ring 10, secured on the inner hub extension 8, of the housing, and another ring 11, secured upon the differential cage 5, with an idler bearing ring 12, disposed therebetween. This thrust bearing for the differential, mounted on the right side of the differential mechanism, referring to Fig. 1, receives but very little thrust, so that only slight wear occurs on these members.

However, referring to Fig. 1, at the left side of the differential mechanism, an exactly similar thrust bearing has been replaced by a race ring 13, secured upon the inner hub extension 9, of the housing, and another race ring 14 is secured upon the differential cage, and disposed between said race members are balls 15, or other rolling means suitably held in proper position by a retainer ring 16. The outer periphery of each of said race rings 13 and 14, is bulged, bent or otherwise formed outwardly as denoted by the reference numerals 17, as shown clearly in Fig. 2, thus affording a considerable space at this point between the race rings to receive the balls or other roller elements 15, therebetween, but the space between the inner portions of said race rings may only be an extremely small amount, as for instance, a few thousandths of an inch. It is apparent therefore, that the bearing may be inserted into a small or restricted space, inasmuch as the ball or roller elements are disposed beyond the confines of the mechanisms separated by the bearings.

Figure 5:
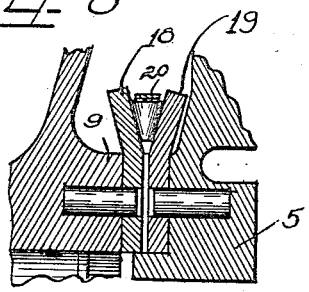
Fig. 5 is a view of a modified bearing embodying my invention.

In the modified form of device illustrated in Fig. 5, is shown a proposed adaptation of race rings 18 and 19, respectively, which are flared at their periphery to receive engaged therebetween tapered rollers 20.

In Fig. 6, an adaptation of a thrust ball bearing to an axle type of mechanism is shown, wherein the inner bearing member is denoted by the reference numeral 21, and the outer bearing member by the reference numeral 22, and the margins of said respective bearing members are deformed outwardly and spaced apart to receive roller balls 23, within a usual ball retainer.

Figure 7:
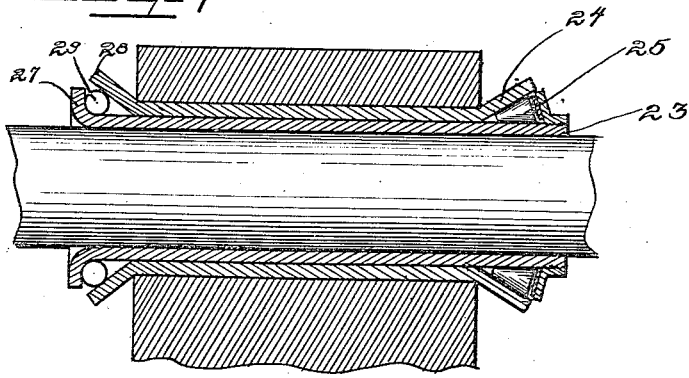
Fig. 7 is a view illustrating a modified form of axle bearing embodying my invention.

In Fig. 7, I have illustrated a double type of axle thrust bearing wherein the inner bearing member is denoted by the reference numeral 23, and the outer member by the reference numeral 24, and at one end thereof provided with tapered rollers 25, interposed between the marginal ends of the bearing, in the present instance only the outer bearing member being flared outwardly to afford a space to receive the tapered rollers.

At the other end of the bearing shown in Fig. 7, another type of bearing is shown wherein the margin 27 of the inner bearing member 23, is flared outwardly to coöperate with the margin 28, of the outer bearing member 22, which is angled, flared, or deformed outwardly to receive balls 29, in the race formed by the flared portions of said bearing members.

In every instance, the bearing members need only be spaced a very small distance apart, so that bearing members of requisite strength may thus be used to properly sustain the load, and the outer end margins or peripheral portions of said bearing members are deformed to afford the races for the ball or other roller elements used. The idea of placing the ball or roller elements of the bearing in a position beyond the actual boundary of the mechanisms between which the bearing is placed, I believe to be broadly new, and I purpose claiming broadly the idea of constructing any form of bearing in which this idea is used.

I am aware that various details of construction may be varied through a wide range without departing from the principles of this invention, and I therefore do not purpose limiting the patent granted otherwise than necessitated by the prior art.

I claim as my invention:

1. In a bearing of the class described, a pair of bearing members disposed closely adjacent one another with the outer margins of said bearing members beyond the faces between which they are used flared apart and rolling means interposed therebetween to maintain said bearing members in separated relation.

2. A bearing of the class described for use between members having adjacent parallel faces comprising a pair of bearing members fitted closely to one another and with the marginal portions of said bearing members projecting beyond the faces and flared apart forming a race, and rolling means interposed in said race to maintain said bearing members separated in rotatable relation.

3. A bearing of the class described comprising in combination with two relatively rotatable members having adjacent parallel faces, of bearing member race elements secured to each thereof, and with the end margins of said race elements projecting beyond said faces and flared outwardly each affording a race, and rolling means disposed in said races to maintain said bearing members separated in rotative relation affording a rolling bearing for said mechanisms.

4. A bearing of the class described comprising two bearing members, the outer marginal portions of each thereof beyond the faces between which they are placed bulged outwardly to form a race space greater than the distance between the exterior surfaces of the main portion of said bearing members, and rolling means disposed in said bulged out portions to maintain said bearing members in separated and rotative relation.

5. A bearing of the class described comprising bearing members, the adjacent faces thereof disposed closely adjacent one another and the outer marginal portion of each of said members bulged outwardly with the outer surfaces thereof a greater distance apart than the outer surfaces of the main portion of said bearing members, and rolling means interposed between the bulged out portions of said bearing members rolling on the adjacent inner surfaces of said bulged out portions to maintain said bearing members in separated and rotative relation.

6. In a device of the class described, the combination with the members between which the bearings are to be used having adjacent parallel faces, of a ball or roller bearing having a part engaged between said faces and a part projecting beyond said faces.

7. A bearing for use in a small space comprising members extending into the space and enlarged outside of the small space to receive balls or rollers therebetween and balls or rollers in said enlarged space.

8. A bearing comprising plates of a thickness to be inserted in small space and enlarged outside of the space to receive anti-friction members therebetween and anti-friction elements in said enlarged part of the plates.

9. In a device of the class described, the combination with the abutting mechanisms having parallel faces, of a ball bearing for said mechanisms having the balls beyond the boundary of said faces.

10. A ball or roller thrust bearing comprising a ball or roller bearing mechanism in which the balls or rollers are in a plane outside of the faces between which the bearing is used.

11. A ball bearing comprising bearing plates, one adapted to be engaged to each of the parallel faces of the abutting members and each plate of a diameter greater than said faces, a ball race formed in the plates outside of said faces, and balls in said race.

12. A bearing comprising members adapted to be engaged between the parallel faces of two elements and the margins of the members flared beyond said faces, and balls or rollers in said flared portions.

13. A ball or roller bearing in which the balls or rollers are placed beyond the complemental faces of the mechanisms between which placed.

14. In combination with the elements to be separated having faces between which the bearing is to be used, of a bearing having a race provided outside of said faces, and anti-friction members in the race.

15. A pair of relatively rotatable members having adjacent parallel faces, a pair of bearing members disposed between said members and projecting beyond said faces, and rolling means interposed between the said bearing members.

In testimony whereof I have hereunto subscribed my name in the presence of two subscribing witnesses.

GEORGE D. BAILEY.

Witnesses:
CHARLES W. HILLS, Jr.,
EARL M. HARDINE.